Sept. 1, 1925.   1,552,015
H. A. SMITH
LAND GRADING MACHINE
Filed March 9, 1923   5 Sheets-Sheet 1

Inventor
*Herschel A. Smith*
By *Jerry A. Mathews*
Attorney

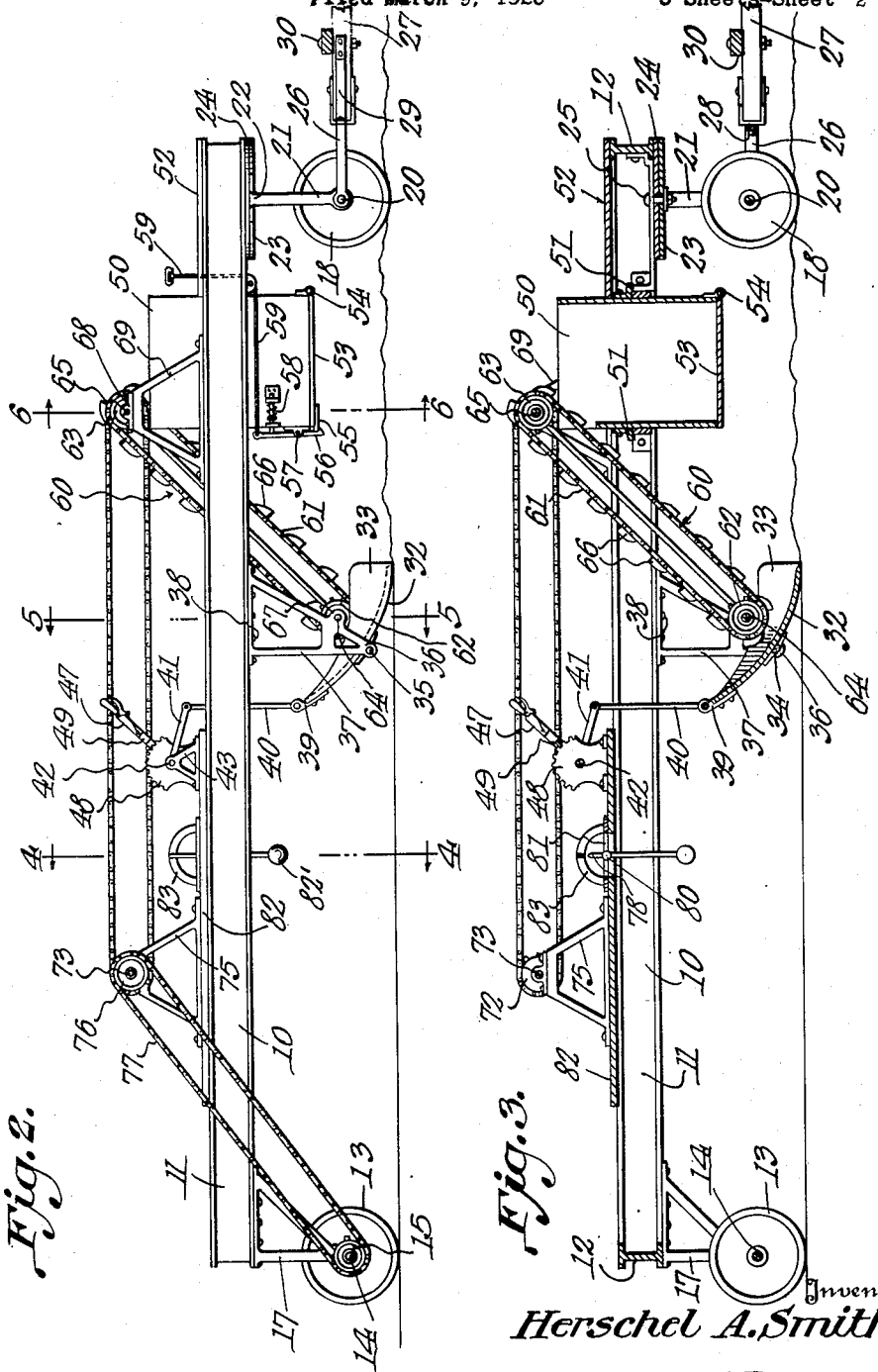

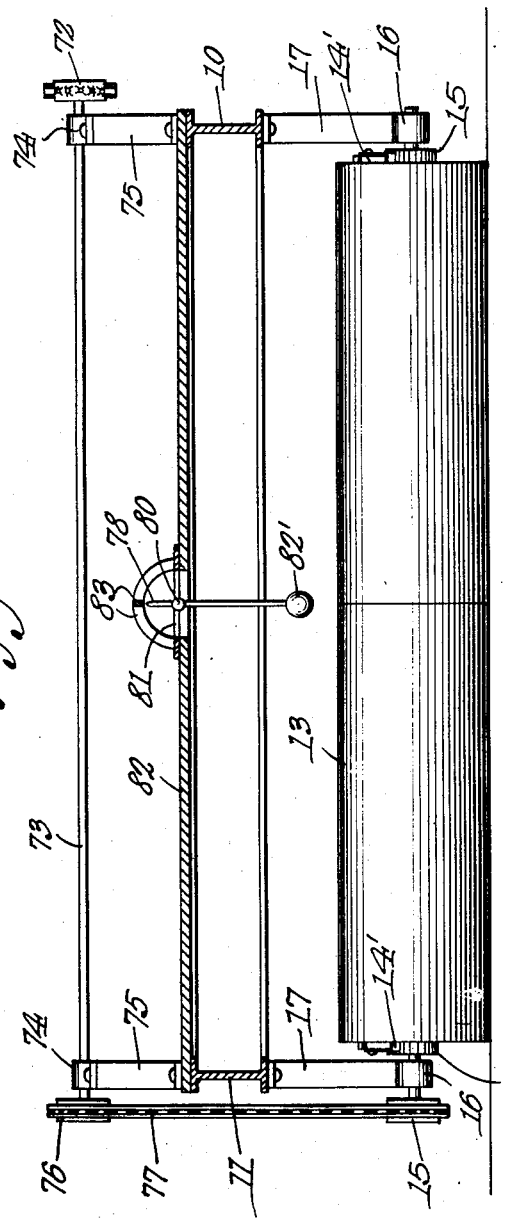

Sept. 1, 1925.
H. A. SMITH
LAND GRADING MACHINE
Filed March 9, 1923
1,552,015
5 Sheets-Sheet 4
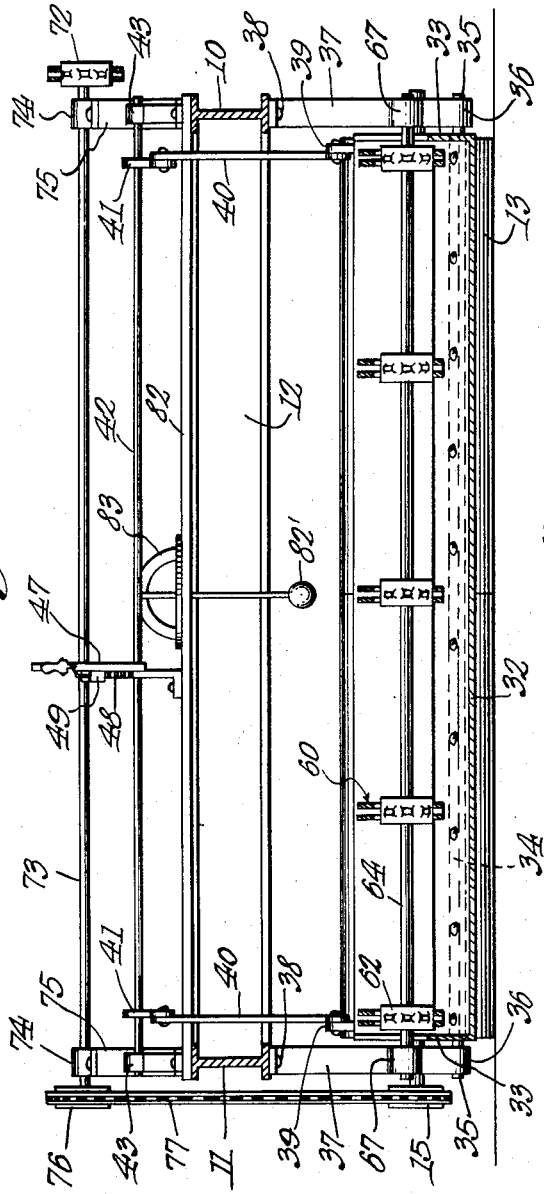
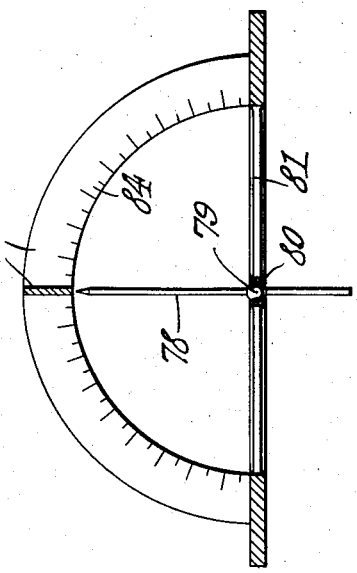
Inventor
Herschel A. Smith
By Jerry A Mathews
Attorney Sept. 1, 1925.

H. A. SMITH 1,552,015

LAND GRADING MACHINE

Filed March 9, 1923  5 Sheets-Sheet 5

Inventor
Herschel A. Smith

By

Attorney

Patented Sept. 1, 1925.

1,552,015

UNITED STATES PATENT OFFICE.

HERSCHEL A. SMITH, OF MOUNTAIN HOME, IDAHO.

LAND-GRADING MACHINE.

Application filed March 9, 1923. Serial No. 623,870.

*To all whom it may concern:*

Be it known that I, HERSCHEL A. SMITH, a citizen of the United States, residing at Mountain Home, in the county of Elmore and State of Idaho, have invented certain new and useful Improvements in Land-Grading Machines, of which the following is a specification.

My invention relates to a machine for use in grading land, such as a field to be irrigated, a road bed, or the like.

In accordance with my invention I provide a machine which is particularly well adapted for grading or leveling land for use in connection with irrigation. The machine embodies a frame which is preferably supported by front and rear rollers. A scraping plate extends transversely of the frame and is adjustably connected therewith, preferably in a manner to permit of its angular adjustment. This plate is adapted to scrape the raised portions of the ground or soil, and deliver the same to a conveyor, which elevates the earth to a box. This box is adapted to dump the earth in a depression or sink in the soil. The filled in portions of the soil are packed by the rear roller. The machine is also equipped with an indicating device, to denote the inclination of the soil, longitudinally, or transversely of the machine, thus enabling the operator to dump the earth at proper points. By the proper manipulation of the machine, the ground being treated may be rendered substantially level, which is advantageous in land to be irrigated, and the surface of the land is also suitably packed.

In the accompanying drawings forming a part of this specification, and in which like numerals are employed to designate like parts throughout the same, Figure 1 is a plan view of a machine embodying my invention, Figure 2 is a side elevation of the same, Figure 3 is a longitudinal sectional view taken on line 3—3 of Figure 1, Figure 4 is a transverse sectional view taken on line 4—4 of Figure 2, looking in the direction of the arrows, Figure 5 is a similar view taken on line 5—5 of Figure 2.

Figure 8 is a perspective view of the scraper or scraping plate,

Figure 9 is a detail sectional view through the indicator,

Figure 10 is a detail section through one of the buckets of the conveyor, and

Figure 11 is an end elevation of one of the roller sections, showing the pawl and ratchet means.

Figure 1:
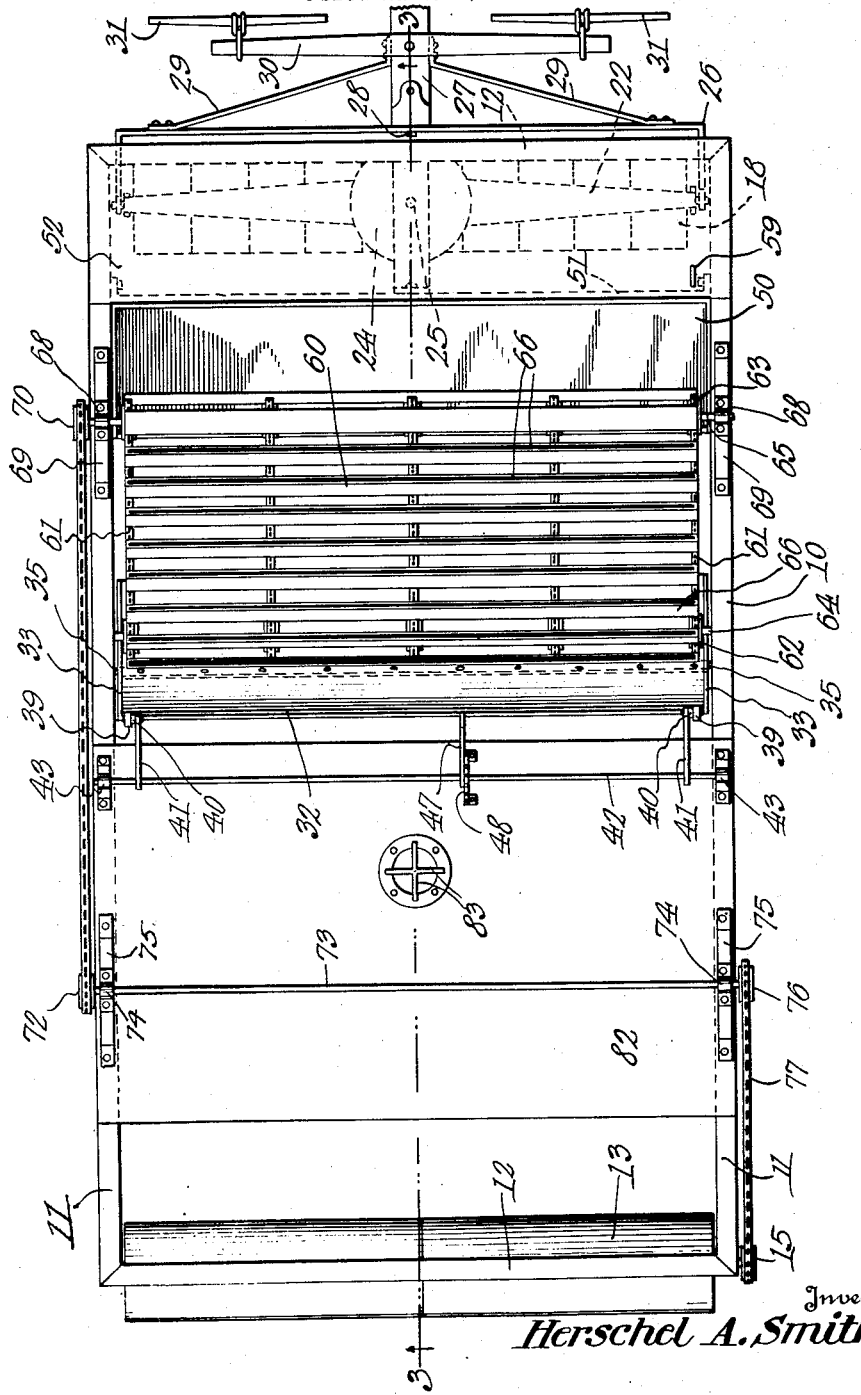
Figure 6:
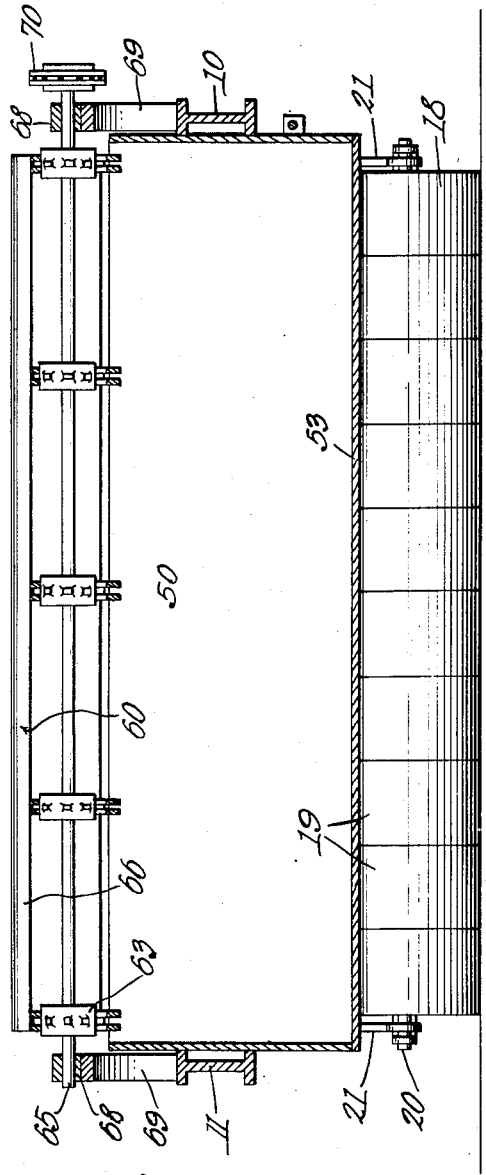
Figure 6 is a similar view taken on line 6—6 of Figure 2.
Figure 7:
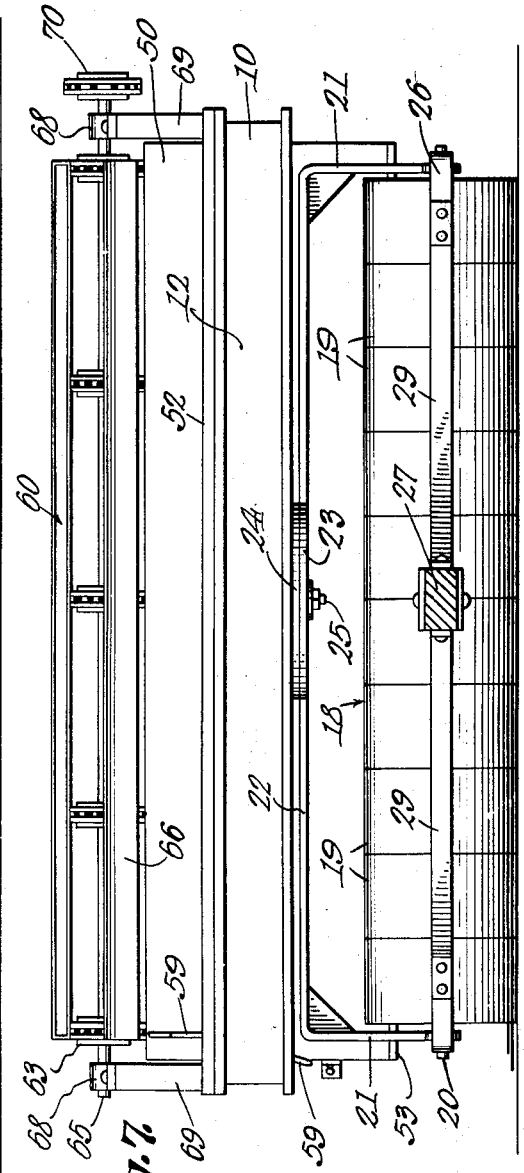
Figure 7 is a front end elevation of the machine.

In the drawings, wherein for the purpose of illustration is shown a preferred embodiment of my invention, the numeral 10 designates the main frame of the machine, which may be formed of channel iron or the like. This main frame is shown as rectangular and as embodying longitudinal and transverse beams 11 and 12, Figure 1.

The rear end of the frame 10 is supported by a packing roller 13 extending transversely thereof, and preferably formed in two sections, which are rotatable upon a transverse shaft 14. This shaft carries a sprocket wheel 15, rigidly secured thereto. The shaft 14 is journaled in bearings 16, formed upon the lower ends of brackets 17, which depend from the beams 11, and are rigidly bolted or otherwise secured thereto. Each section of the roller 13 is provided at its outer end with a spring-pressed pawl 14', engaging a ratchet wheel 15', rigidly secured to the shaft 14. When the roller is traveling forwardly, as indicated more clearly in Figure 10, the roller sections rotate the shaft 14 forwardly, by virtue of the pawl and ratchet connection. However, if the shaft is turning faster than either roller section, as will occur when the machine is turning around, the connection will permit of a differential action, allowing the inner roller section to travel slowly.

The forward end of the frame 10 is supported by a transverse roller 18, preferably formed in a plurality of sections 19, and these roller sections are freely rotatable upon a transverse steering axle 20, rotatably mounted in the depending ends 21 of an inverted U-shaped yoke 22. This yoke is provided in its central portion with a plate or fifth wheel section 23, slidably engaging a coacting plate or fifth wheel section 24, and pivotally connected therewith by means of a pin or bolt 25. The plate 24 is suitably rigidly secured to the forward end of the frame 10, at its central longitudinal axis.

A draft appliance is connected with the yoke 22 and this draft appliance embodies a horizontal U-shaped member 26, which straddles the yoke 22, and pivotally receives the free ends of the axle 20. The U-shaped element 26 is rigidly connected with a tongue 27, by a bolt 28 or the like and by means of diagonal braces 29. The tongue may carry a double tree 30, to which are attached single trees 31. This draft device is designed for use in connection with draft animals, but the invention is in no sense restricted to the use of draft animals, as the draft appliance may be altered so that a tractor or the like may be employed to propel the machine.

The numeral 32 designates a scraper or scraping plate, which extends transversely beneath the frame 10, and is transversely curved. This scraper is provided at its ends with upstanding flanges 33. A bar 34 is arranged beneath the scraper 32, in its central longitudinal axis and is bolted or rigidly secured thereto, with rounded ends 35 projecting outwardly beyond the ends of the scraper. These rounded ends are pivotally mounted within bearings 36, formed in the ends of V-shaped brackets 37. These brackets are arranged beneath the beams 10 and are rigidly secured thereto by means of bolts 38 or the like. Means are provided to angularly adjust the scraper 32 and hence raise and lower its forward cutting edge with respect to the soil, by turning the scraper upon the bar 34 as a pivot point. This means embodies knuckles 39, bolted to the rear edge of the scraper, near its ends, and these knuckles are pivotally connected with links 40, which extend upwardly for pivotal connection with brackets 41, rigidly mounted upon a rock shaft 42. This rock shaft extends transversely of the machine and is journaled in bearings 43, bolted to the beams 11.

The means to turn the rock shaft 46 embodies a lever 47, rigidly mounted upon the rock shaft, and operating in proximity to a toothed segment 48, carrying a latch 49, whereby the lever may be locked in a selected angular position.

The numeral 50 designates a box or hopper, for receiving and holding earth. This box is arranged transversely of the frame, in its forward portion, and is rigidly secured thereto by any suitable means, as indicated at 51. A platform 52 is mounted upon the frame, in advance of the box or hopper 50. The box has a bottom 53, hinged thereto at its forward edge, at 54, and the bottom 53 carries a latch 55, to be detachably engaged by a latch 56. This latch is pivoted at 57, and is held closed by a spring 58, and is shifted to the open position, to release the bottom 53, by a cable 59 or the like.

The numeral 60 designates an endless conveyor, which operates in advance of, and in proximity to the scraper 32, and is adapted to take the earth from the scraper 32 and deliver the same to the box 50. Particular attention is called to the fact that this conveyor operates in advance of the scraper near its forward end, and hence will take up the earth before the earth is fed to the rear edge of the scraper. This conveyor may be of any well known or preferred type, but I preferably form the same of a plurality of sprocket chains 61, engaging sprocket wheels 62, and 63, which are rigidly mounted upon shafts 64 and 65, respectively. The sprocket chains 60 are connected by transversely extending scoops or buckets 66, suitably secured thereto. The shape in cross-section of one of these buckets is illustrated in Figure 10. The shaft 64 is journaled in bearings 67, carried by the brackets 37, and the shaft 65 is journaled in bearings 68, carried by brackets 69, mounted upon the beams 10.

The shaft 65, Figure 1, is rotated by a sprocket wheel 70, rigidly mounted thereon, and engaged by a sprocket wheel 72, rigidly mounted upon a transverse shaft 73. The shaft 73 is journaled in bearings 74, carried by brackets 75, rigidly mounted upon the beams 10. The shaft 73 has a sprocket wheel 76 rigidly mounted thereon and engaged by a sprocket chain 77, and this sprocket chain extends downwardly for engagement with the sprocket wheel 15. It is thus seen that the rotation of the roller 13 is transmitted to the conveyor 60, through the medium of the intermediate gearing.

In accurately grading land which is to be used for irrigation purposes, it is highly desirable to know when the land is level or substantially so, and in order that the operator may be appraised of the condition of the surface of the soil upon which he is to operate, I provide an indicator for this purpose. This indicator embodies a freely pivoted pointer 78, having a ball 79 secured thereto, and operating in a socket 80, carried by a spider 81. This spider is supported by a platform 82. The pointer 78 is provided at its lower end with a weight 82'. It is thus apparent that the pointer will remain vertical, when the frame of the machine tips upon its transverse or longitudinal axis, or both. The numeral 83 designates a pair of segmental scale plates, which are concentric with respect to the pivot of the pointer 78. The plates 83 are arranged at right angles to each other and are provided with suitable scales, 84, for indicating the degree of inclination of the soil. It is obvious that the pointer 78 coacts with both plates 83.

In the operation of the machine, it is drawn forwardly over the land or soil to be treated, and when desired, the scraper 32 is brought into engagement with the soil. The soil is scraped and cut and works rearwardly upon the scraper 32, and is taken up by the conveyor 60 and dumped into the box 50. When a low point in the surface is reached, the soil is dumped upon the ground, and the scraper 32 may be employed to level this dumped soil. The rear roller 13 serves to suitably pack the filled in surface. The weighted pointer 78 operates in conjunction with the scale plates 83, and indicates the inclination of the surface being treated.

It is to be understood that the form of my invention herewith shown and described is to be taken as a preferred example of the same, and that various changes in the shape, size and arrangement of parts may be resorted to without departing from the spirit of my invention or the scope of the subjoined claims.

Having thus described my invention, I claim:

1. A machine for grading land, comprising a frame, rollers supporting the ends of the frame, a scraping blade arranged beneath the frame, supports carried by the frame and pivotally connected with the scraping blade near its ends whereby such blade may turn upon its longitudinal axis, said blade being transversely inclined and facing forwardly, means to angularly adjust the blade and lock the same in adjustment against turning movement, a hopper mounted upon the frame in advance of the scraping blade, an endless elevator having its lower end arranged above the upper earth supporting face of the scraping blade and its upper end discharging into the hopper, said scraping blade and endless elevator being disposed at an acute angle, means to drive the endless elevator when the machine is moved forwardly for causing the lower run of the endless elevator to travel rearwardly toward the upper surface of the scraping blade and feed the earth upon such upper surface, means for releasing the load from the hopper, and means to effect the longitudinal travel of the machine.

2. A machine for grading land, comprising a frame, rolling means for supporting the frame, a scraping blade arranged beneath the frame and transversely inclined and curved in cross section, supports depending from the frame and pivotally connected with the scraping blade near its longitudinal axis, a transverse rock shaft mounted upon the frame, cranks carried by the rock shaft, links connecting the cranks and the upper rear portion of the blade, means to turn the rock shaft for angularly adjusting the blade and locking the rock shaft in a selected adjusted position, a hopper mounted upon the frame in advance of the scraping blade, an inclined endless elevator having exteriorly arranged buckets, said elevator having its lower end arranged near and above the bottom of the scraping blade and substantially in alinement with the turning axis of the blade and its upper end discharging into the hopper, said blade and elevator being disposed at an acute angle, means to drive the endless elevator from the rolling means so that the lower run of the conveyor travels rearwardly toward the scraping blade when the machine is driven forwardly, means to release the load from the hopper, and means to effect the forward travel of the machine.

3. A machine for grading land, comprising a frame, rolling means for supporting the frame, a scraper blade carried by the frame, a hopper mounted upon the frame in advance of the blade, and an endless elevator arranged at an inclination between the blade and the hopper, said elevator extending upwardly toward its forward end with its lower end arranged above the earth supporting face of the blade, the forward lower run of the endless elevator traveling toward the blade and the upper rear run of the elevator serving to convey the earth from the blade to the hopper, and means to drive the elevator.

In testimony whereof I affix my signature.

HERSCHEL A. SMITH.